United States Patent
Li et al.

(10) Patent No.: US 11,907,312 B1
(45) Date of Patent: Feb. 20, 2024

(54) USER TYPE AFFINITY ESTIMATION USING GAMMA-POISSON MODEL

(71) Applicant: Snap Inc., Santa Monica, CA (US)

(72) Inventors: Yanen Li, Los Angeles, CA (US); Fei Wu, University Park, PA (US); Ning Xu, Irvine, CA (US)

(73) Assignee: Snap Inc., Santa Monica, CA (US)

( * ) Notice: Subject to any disclaimer, the term of this patent is extended or adjusted under 35 U.S.C. 154(b) by 1160 days.

(21) Appl. No.: 15/862,403

(22) Filed: Jan. 4, 2018

(51) Int. Cl.
| | | |
|---|---|---|
| *G06F 16/9535* | (2019.01) | |
| *G06N 20/00* | (2019.01) | |
| *G06N 7/00* | (2023.01) | |
| *H04L 67/50* | (2022.01) | |
| *G06Q 50/00* | (2012.01) | |

(52) U.S. Cl.
CPC .......... *G06F 16/9535* (2019.01); *G06N 7/00* (2013.01); *G06N 20/00* (2019.01); *H04L 67/535* (2022.05); *G06Q 50/01* (2013.01)

(58) Field of Classification Search
CPC ............ G06F 16/9535; G06F 16/9536; G06F 16/9538; G06N 20/00; G06N 7/00; G06N 20/10; G06N 20/20; G06N 7/005; G06N 3/0472; H04L 67/22; G06Q 50/01; G06Q 30/0269; G06Q 30/0202; G06Q 30/0204; G06Q 30/0224
See application file for complete search history.

(56) References Cited

U.S. PATENT DOCUMENTS

| | | | | |
|---|---|---|---|---|
| 7,567,958 B1 * | 7/2009 | Alspector | ........... | G06F 16/9535 |
| | | | | 707/999.005 |
| 2011/0082824 A1 * | 4/2011 | Allison | .................. | G06N 20/00 |
| | | | | 706/20 |
| 2011/0302155 A1 * | 12/2011 | Yan | ..................... | G06F 16/9535 |
| | | | | 707/723 |
| 2013/0238748 A1 * | 9/2013 | Sakahira | ................. | H04L 67/10 |
| | | | | 709/217 |
| 2014/0280214 A1 * | 9/2014 | Han | .................. | G06F 16/24575 |
| | | | | 707/748 |

(Continued)

FOREIGN PATENT DOCUMENTS

WO    WO-2013063718 A1 *  5/2013  ....... G06F 17/30522

OTHER PUBLICATIONS

KDD '15: Proceedings of the 21th ACM SIGKDD International Conference on Knowledge Discovery and Data Mining Aug. 2015 pp. 1651-1660.*

(Continued)

*Primary Examiner* — Rehana Perveen
*Assistant Examiner* — Troy A Maust
(74) *Attorney, Agent, or Firm* — Schwegman Lundberg & Woessner, P.A.

(57) ABSTRACT

Systems and methods are provided for generating a user click history table and a random bucket training table, generating training data for training a user-type-affinity machine learning model by combining the user click history table and the random bucket training table, and training the user-type-affinity machine learning model with the generated training data. The systems and methods further provide for generating a user click prediction table and generating user-type-affinity prediction values for each of the plurality of users by inputting the user click prediction table into the user-type-affinity machine learning model.

20 Claims, 10 Drawing Sheets

(56) References Cited

U.S. PATENT DOCUMENTS

2016/0292590 A1* 10/2016 Kruglick ............ G06F 16/24568
2019/0130436 A1* 5/2019 Ma ......................... G06N 20/00

OTHER PUBLICATIONS

Qiu, Lin & Gao, Sheng & Lyu, Qinjie & Guo, Jun & Gallinari, Patrick. (2017). A Novel Non-Gaussian Embedding Based Model for Recommender Systems. Neurocomputing. 278.*

Qiu, Lin & Gao, Sheng & Lyu, Qinjie & Guo, Jun & Gallinari, Patrick. (2017). A Novel Non-Gaussian Embedding Based Model for Recommender Systems. Neurocomputing. 278. (Year: 2017).*

* cited by examiner

USER TYPE AFFINITY ESTIMATION USING GAMMA-POISSON MODEL

BACKGROUND

The affinity of a user to a type of content (e.g., editions from the same publisher) is an important signal in predicting future engagement with content. Accurately estimating such affinity, however, is a challenging task.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to machine learning modeling of user type affinity. As explained above, the affinity of a user to a type of content (e.g., editions from the same publisher) is an important signal in predicting future engagement. Accurately estimating such affinity, however, is a challenging task. For frequent users, simply dividing the number of interactions with content (e.g., clicks) by the number of impressions (e.g., the number of times the content is displayed to the user or viewed by the user) may give a good estimate. Such estimates. however, are erroneous for users who sparsely or infrequently interact with the content. Feature-based approaches that learn functions predicting the scores using none-click features may alleviate the problem for infrequent users, but they do not take the full advantages of the interaction history of frequent users. Motivated by these challenges, the user-type-affinity (e.g., user publisher affinity) modeling described herein provides advantages over the previous approaches by more accurately estimating the affinity of a user to a type of content.

In one example, embodiments described herein may be used to determine a ranking for content in a messaging system. For example, a messaging system may provide a number of media collections or channels from publishers that may be viewed by users via the messaging system. One example of a media collection is a channel from National Geographic that may provide content updated regularly (e.g., daily, hourly, weekly, monthly) about science and nature. For example, the media collection from National Geographic may comprise a number of media content items (e.g., images, video, text. audio) that is displayed to a user. A user may scroll or swipe through the media content items to view each one, interact with a media content item to read further information about the particular media content item (e.g., to learn more about an image of a rare snake found in Africa), and so forth. Other examples of media collections include a fashion and style channel from a fashion magazine. sports updates from a sports media organization. celebrity news from an entertainment organization. daily news from a news organization, workouts from a fitness organization. and so forth. An example messaging system is described later with respect to FIGS. 5-8.

Figure 1:
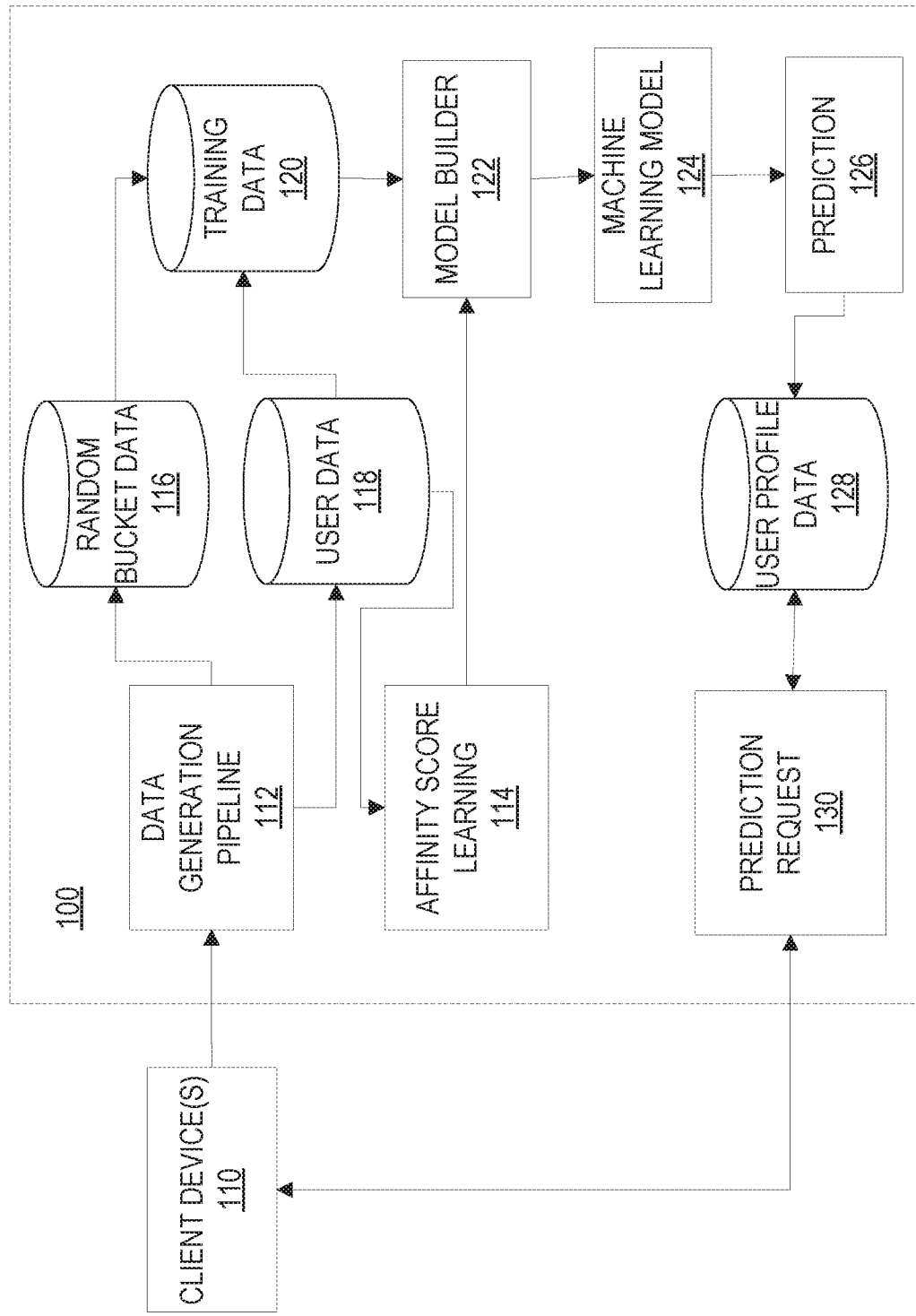
FIG. 1 is a block diagram illustrating an example user-type-affinity machine learning modeling system, according to some example embodiments.

FIG. 1 is a block diagram illustrating a user-type-affinity modeling system 100, according to some example embodiments. Further details describing the process of the user-type-affinity modeling system 100 are described below with respect to FIG. 2. Aspects of the user-type-affinity modeling system 100 may be implemented using one or more computing devices (e.g., a server system comprising one or more server computers).

Client device(s) 110 may provide to the system 100 a plurality of data related to users and user interactions (e.g., clicks, impressions, views. etc.) with content such as a media collection (also referred to herein as a "channel"). This data is received and/or retrieved and collected by the data generation pipeline 112. The data generation pipeline 112 generates user data 118 and random bucket data 116 from the data collected from the client device(s) 110.

User data 118 may comprise any number of features related to each of a plurality of users, including user demographics, user interests, geographic location, user interaction with content such as one or more media collections, and so forth. User data 118 may further comprise a user click history table as described below. A user click history table may comprise a user identifier, a type (e.g., media collection or publisher), and click counts.

Random bucket data 116 may comprise labeled training data for media collection impressions. Labeled training data for a type (e.g., channel or media collection) may be inferred from the random bucket data.

Affinity score learning 114 is the framework for affinity score learning, explained in further detail below. The affinity score learning 114 framework uses user data 118 to train a function for the affinity score. The trained function is then used by the model builder 122 for building the machine learning model.

The training data 120 comprises user data 118 and random bucket data 116. In one example described below, the training data 120 is a combination of a user click history table and a random bucket training table.

The model builder 122 uses the affinity score learning 114 and training data 120 to train a machine learning model 124. The machine learning model 124 is used to provide a prediction 126 of user-type-affinity. The prediction 126 is stored as user profile data 128. The user profile data 128 may comprise a user identifier and a user-type-affinity prediction value (e.g., score) for each type (e.g., publisher or media collection).

The prediction request 130 may access the user profile data 128 to send one or more scores to one or more client device(s) 110. For example, a user of a client device 110 may indicate a wish to view media collections or channels via the client device 110 (e.g., via a messaging or other application). The client device 110 may send a request to the prediction request 130 to get one or more prediction values for the user and the media collections, and/or a ranking of the media collections. The client device 110 may display the media collections ranked in an order based on the prediction values received by the prediction request 130. In this way, the media collection with the highest user-type-affinity score may be displayed to a user.

The formulation for the user-type-affinity modeling denotes a user using index i and a type (e.g., publisher of content or a media collection) as index j. For example, a type may be a particular organization or other entity (e.g., a publisher of content), a media collection (e.g., comprising media content items) associated with a particular organization or publisher, and the like. The following formula is used as the final affinity score/alpha ij:
where \alpha (hat) is an estimate of affinity (of user i to type/publisher j), xij is a feature vector (not click related). f( . . . ; wj) is a function estimating affinity score to $$\hat{\alpha}_{ij} = f(x_{ij}; w_j) \cdot g_{ij} \begin{cases} c_{ij} \sim \text{Poisson}(E_{ij} \cdot g_{ik}), E_{ij} = m_{ij} \cdot f(x_{ij}; w_j) \text{ is expected clicks} \\ g_{ij} \sim \text{Gamma}\left(\text{mean} = 1, \text{var} = \frac{1}{\gamma}\right), \text{ the correction factor} \\ \hat{g}_{ij} = \frac{\gamma + \gamma_{ij}}{\gamma + E_{ij}} = \frac{\gamma + c_{ij}}{\gamma + \sum_{e \in I_g} f(x_e; w_j)} \\ \text{CTR correction factor} + \text{feature-based } CTR \end{cases}$$

each type/publisher based on features (we can also refer to this function as our global model), and gij is the correction factor that depends on user click history. Furthermore, \gamma is a hyper-parameter, cij is the number of clicks, and Eij is the expected number of clicks.

The feature vector xij comprises features for the user i and the type j. Example features for a user may be demographics (e.g., age, gender, nationality. language spoken, etc.), interests, geographic location, and so forth. Example features for a type such as a media collection from a particular organization may include subject(s) associated with the media collection, an age range of target or typical users for the media collection, and so forth.

Notice that the term gij for an infrequent user should be close to one. Therefore, the affinity scores for such users are largely dependent on the global model. On the other hand, the affinity scores for frequent users are largely affected by gij, which is largely determined by number of historical clicks.

The above formula is derived by assuming (i) clicks of a user to each type (e.g., publisher or media collection) is a Bernoulli process, (ii) clicks of all users to each type is also a Bernoulli process, and (iii) multiplicative relation between global and correction factor to the final affinity score. Under these assumptions, the function f( . . . ; wij) takes the form of logistic regression.

In the formulation, wij are unknowns and thus, f( . . . ; wij) needs to be determined through supervised learning. The affinity score learning strategy (e.g., how to train f) comprises a general framework following a process similar to expectation maximization (EM).

Figure 2:
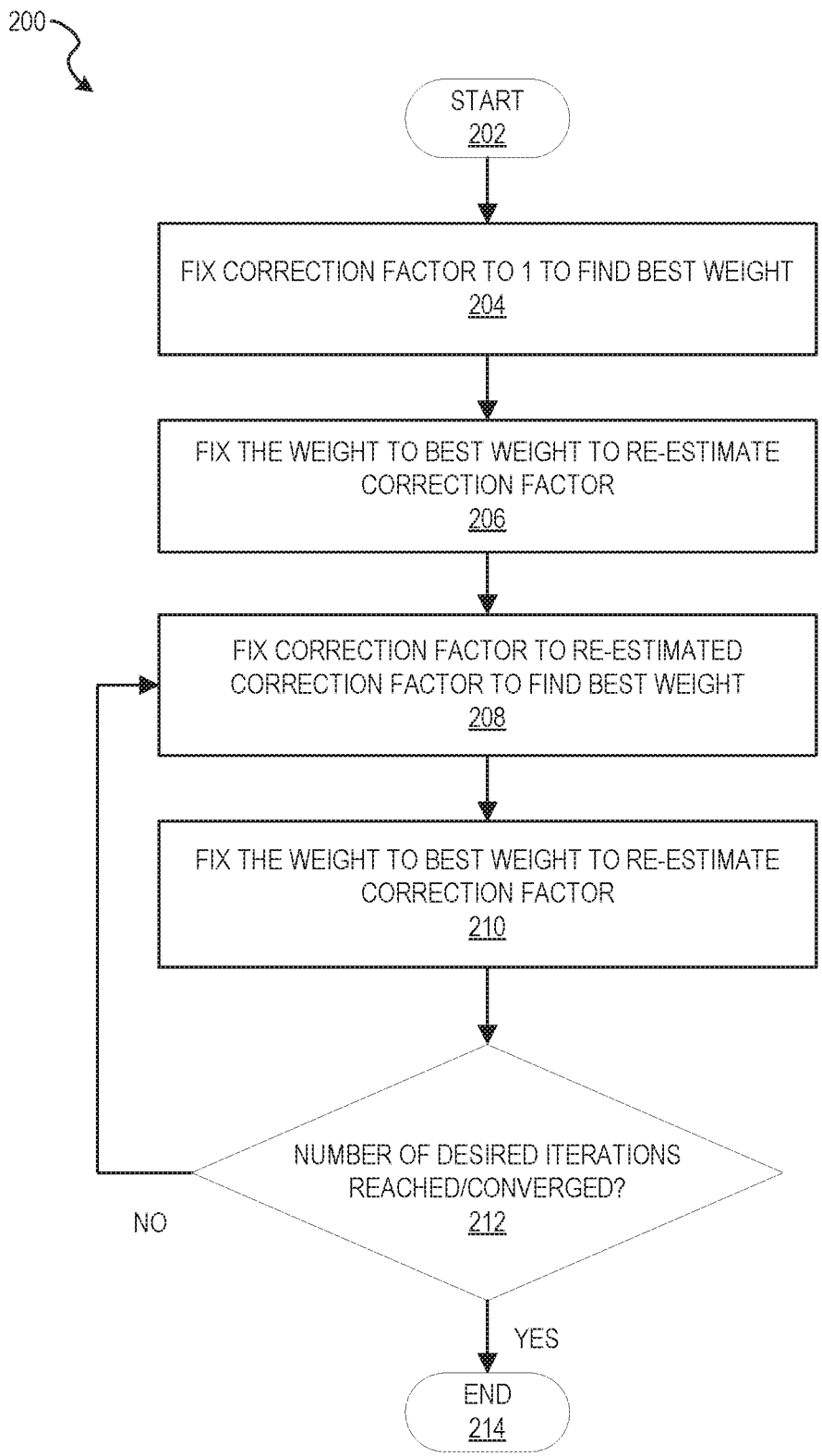
FIG. 2 is a flow chart illustrating aspects of a method, according to some example embodiments.

FIG. 2 is a flow chart illustrating aspects of a method 200 for an affinity score learning strategy, according to some example embodiments. For illustrative purposes. method 200 is described with respect to the user-type affinity modeling system 100 of FIG. 1. It is to be understood that method 200 may be practiced with other system configurations in other embodiments.

The method 200 starts at operation 202, and in operation 204. a computing device (e.g., one or more server computers of system 100, such as affinity score learning 114) fixes all gij (the correction factor) to be 1, and then finds the best wj (the weight or coefficient). In operation 206. the computing device fixes wj to the best wj found in operation 204 to re-estimate gij. In operation 208, the computing device fixes gij to the re-estimated gij determined in operation 206, to find the best wj. In operation 210. the computing device fixes wj to the best weight determined in operation 208, to re-estimate gij.

In operation 212. the computing device determines if a number of desired iterations is reached or converged. For example, the computing device determines that a number of desired iterations is reached or converged when the changes in wj in each iteration meet a predetermined threshold.

If the number of desired iterations is not reached, operations 208 and 210 are repeated until the number of desired iterations is reached. For example, in operation 208, the computing device fixes gij to the re-estimated gij determined in operation 210 to find the best wj, and in operation 210 the computing device fixes wj to the best wj determined in operation 208 to re-estimate gij. If the number of desired iterations is reached, the method 200 ends at operation 214, and the computing device sets the final gij and wj determined in the last iteration. This may be used by the model builder 122 for training the machine learning model 124.

Figure 3:
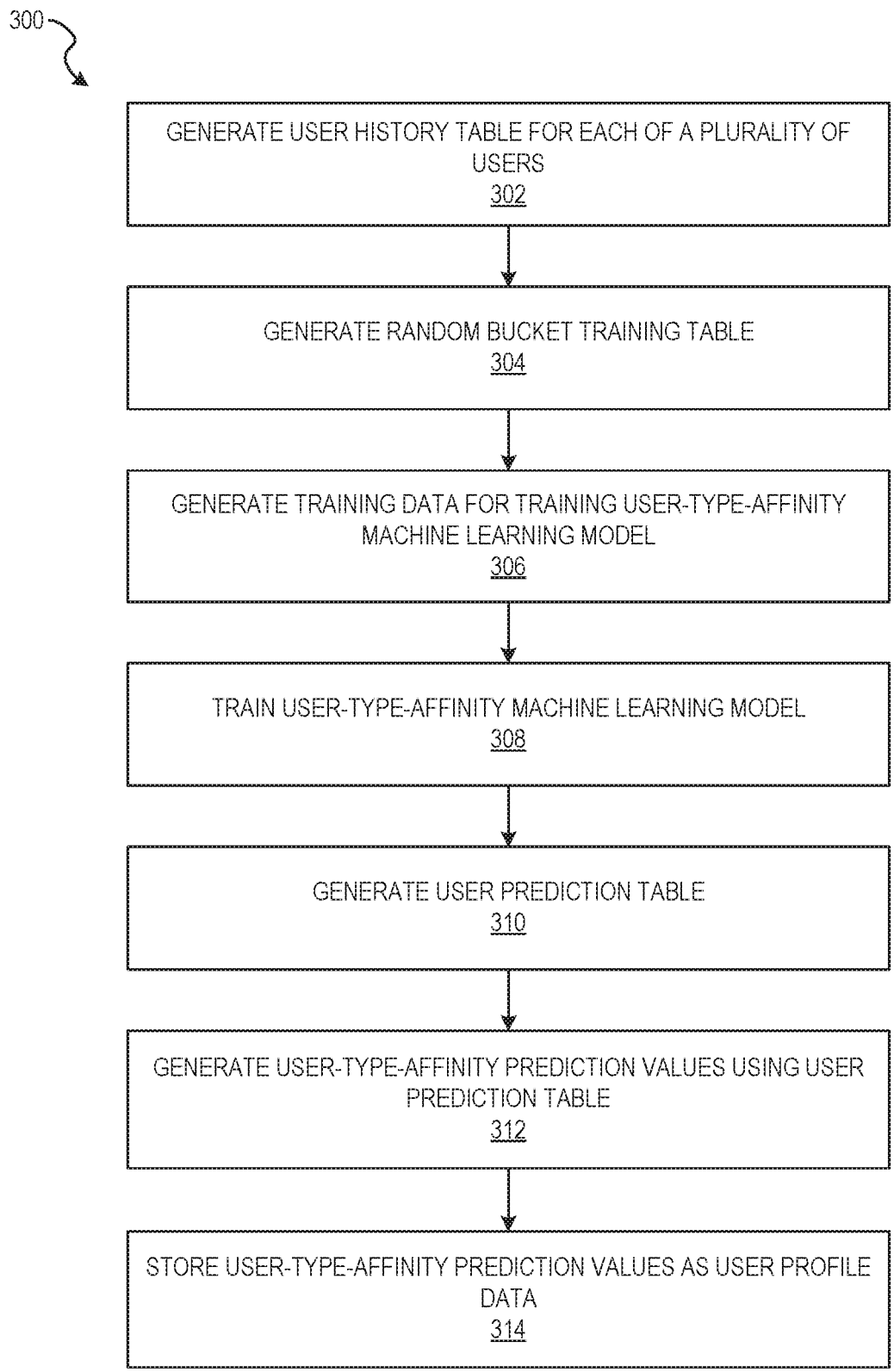
FIG. 3 is a flow chart illustrating aspects of a method, according to some example embodiments.

FIG. 3 is a flow chart illustrating aspects of a method 300 for training the user-type-affinity machine learning model and generating prediction values using the trained user-type-affinity machine learning model, according to some example embodiments. For illustrative purposes, method 300 is described with respect to the user-type-affinity modeling system 100 of FIG. 1. It is to be understood that method 300 may be practiced with other system configurations in other embodiments.

In operation 302, a computing system (e.g., computing system 100 via data generation pipeline 112) generates a user click history table for each of a plurality of users. Each sample in the user click history table comprises at least a user identifier, a type, and one or more counts. The type may be a publisher (e.g., an entity that publishes content), a particular media collection (e.g., a collection of media content items associated with a publisher), and the like. The counts may be the number of times a user clicks on a particular type of content (e.g., publisher, media collection, etc.). There may be multiple columns for counts. The counts statistics may span multiple time granularity. A user click history table may comprise user data for each day.

The user click history table is generated from user data received from a plurality of client devices 110. In one example, the user data for the user click history table is received from a messaging application running on each of a plurality of client devices 110 that provides a plurality of media collections to be displayed on the client devices 110 and viewed by a plurality of users.

The user click history table may be generated using user data collected from a predetermined amount of time. For example, the computing system may read data for the user click history table a few hours, one or two days, a week. and so forth, prior to the date that the data will be used. The generated user click history table may be stored to one or more databases (e.g., user data 118).

In operation 304, the computing system (e.g., computing system 100 via data generation pipeline 112) generates a random bucket training table. In operation 306. the computing system (e.g., computing system 100 via data generation pipeline 112) generates training data 120 for the user-type-affinity machine learning model by combining the user click history table and the random bucket training table (e.g., via a database join function). The training data 120 may be based on the user click history table and the random bucket training table for data over a period of time. For example, the computing system may aggregate user click history data for each channel for each user for two previous weeks or another predetermined time period.

In operation 308, the computing system (e.g., computing system 100 via model builder 122) trains the user-type-affinity machine learning model (e.g., the Poisson Gamma model) with the generated training data 120 to produce a trained user-type-affinity machine learning model (e.g., machine learning model 124). The trained user-type-affinity machine learning model may now be used to generate user-type-affinity prediction values.

In operation 310, the computing system generates a user prediction table to be used to generate the user-type-affinity prediction values. The user prediction table is basically the same as the user click history table except that it is generated from data one day prior to the day of prediction (e.g., the execution day). The reason for using a different table for prediction is that the −1 day count feature is the sum of −1 day label in the offline training table. The offline training table is the combined user click history table and random bucket data table. Using both −1 day overlaps feature values with labels. Therefore, example embodiments use −2 day feature joining with −1 day offline training data, then do score prediction on −1 day user feature data.

In operation 312. the computing system (e.g., computing system 100 via prediction 126) generates user-type-affinity prediction values for each of the plurality of users by inputting the user click prediction table into the user-type affinity machine learning model to output user-type-affinity prediction values. The user-type-affinity prediction values may be stored as user profile data in one or more databases (e.g., user profile data 128), as shown in operation 314. The user-type-affinity prediction values indicate how much preference a user has for each type (e.g., each publisher or media collection). The user-type-affinity prediction values may be updated every day (or other appropriate time period).

Figure 4:
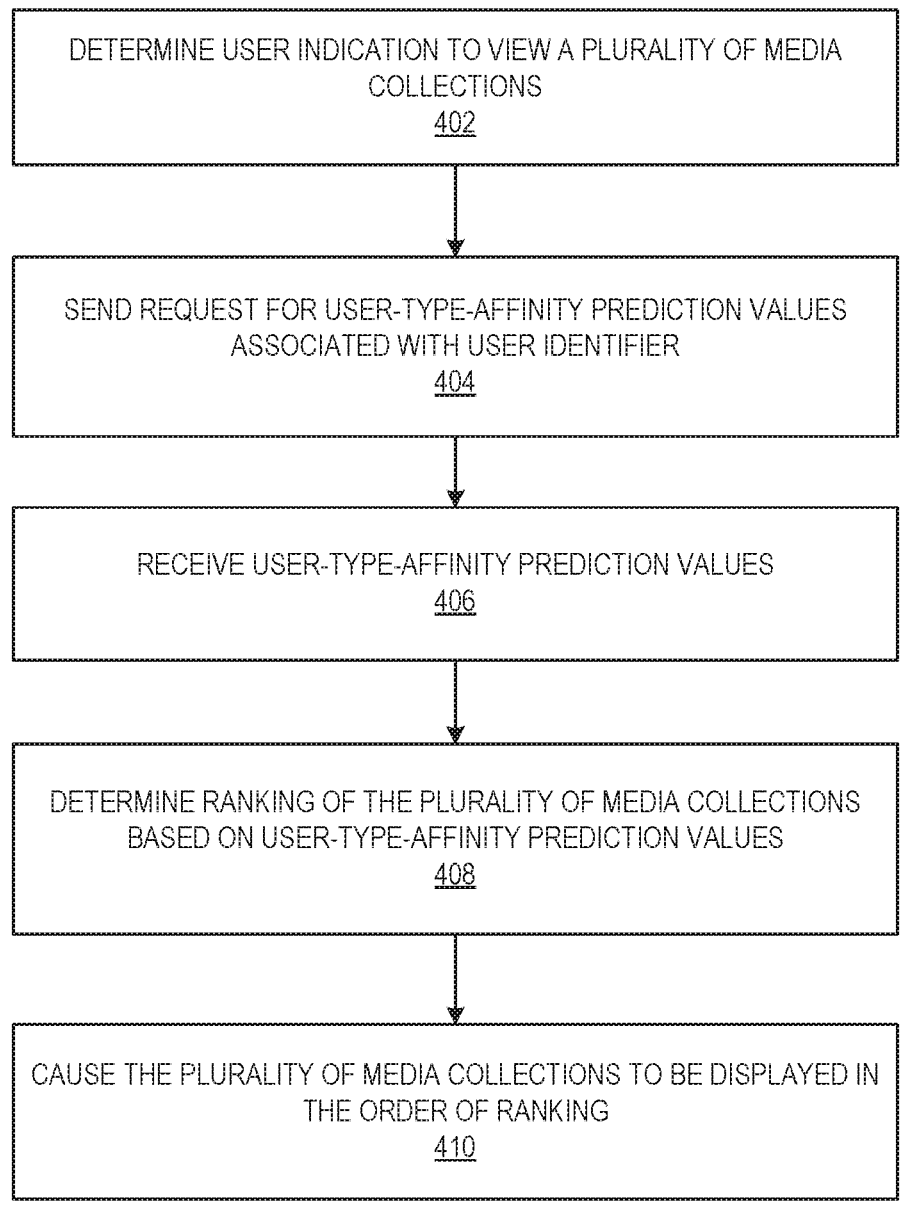
FIG. 4 is a flow chart illustrating aspects of a method, according to some example embodiments.

The user profile data 128 may then be accessible by a plurality of client devices to rank content to provide to a user according to the user-type-affinity prediction values. FIG. 4 is a flow chart illustrating aspects of a method 400 for requesting and ranking media collections based on user-type-affinity prediction values, according to some example embodiments. For illustrative purposes. method 400 is described with respect to the user-type-affinity modeling system 100 of FIG. 1. It is to be understood that method 400 may be practiced with other system configurations in other embodiments.

In operation 402, a computing device (e.g., client device 110) determines that a user has indicated a desire to view a plurality of media collections. For example, the user may interact with the computing device, such as via a touch screen of a display of the computing device, menu items in a graphical user interface of the computing device, one or more buttons on the computing device, or the like, to select an option to view a plurality of media collections.

In operation 404, the computing device sends a request to a computing system (e.g., computing system 100) for one or more user-type-affinity prediction values for the user. The request may include a user identifier or other identifying information for the user or relevant information.

The computing system (e.g., via prediction request 130 of computing system 100) receives the request for the one or more user-type-affinity prediction values and accesses the stored user-type-affinity prediction values in the user profile data 128 to determine one or more user-type-affinity prediction values associated with the user identifier. The computing device sends the one or more user-type-affinity prediction values to the computing device.

In operation 406, the computing device receives the user-type-affinity prediction values from the computing system. In operation 408, the computing device determines a ranking of the plurality of media collections based on the user-type-affinity prediction values. For example, the computing device may rank the user-type-affinity prediction values from high to low in the order to display the media collections to the user. In another example, the user-type-affinity prediction values received from the computing system may include a ranking.

In operation 410, the computing device causes the plurality of media collections to be displayed in order of the ranking. For example, the plurality of media content items may be ranked in an order based on the user-type-affinity prediction values such that a media collection of the plurality of media collections that is associated with a highest prediction value is displayed first in a plurality of media collections.

The computing device may capture user click data for the media collections and send the user click data to the computing system (e.g., via data generation pipeline 112) to be used for training data and predicting future user-type-affinity prediction values. In this way, new user data is continually generated and the user-type-affinity machine learning model may be regularly updated.

In testing, the inventors found that the user-type-affinity prediction machine learning model provided improved prediction results over previous methods. For example, the below table shows a comparison of affinity scores estimated by different methods. The time length in parenthesis defines the time period where historical tap ratio is computed on.

|  | Poisson-Gamma | HTR (3-day) | HTR (1 week) |
| --- | --- | --- | --- |
| RMSE | 0.429 | 0.705 | 0.487 |

To validate example embodiments, the inventors conducted experiments on a messaging system ranking data. The messaging system is associated with a social network application. The application features a media collection page, where news/media collections from hundreds of publishers (such as, New York Times) are shown to users. The initial page displays the cover images and the titles, once clicked the body of the content is shown.

The effectiveness of the affinity scores obtained by example embodiments was evaluated in a click count prediction task. The inventors wanted to predict how many times a user clicked on media collections from a certain publisher using the affinity scores. As the affinity scores can be interpreted as a corrected probability of a user clicking media collections from one publisher, we use $\alpha_{ij}|I_ij|$ as the prediction model, where $|I_ij|$ is the number times media collections from publisher j is shown to user i (number of impressions). We compare the scores estimated using Gamma-Poisson model with scores estimated using historical tap ratio. The historical tap ratio (HTR) is defined as the number total clicks divided by the total number of impressions within a period of time. We use the data 0.25% of all the users from Jul. 30, 2017 to Aug. 5, 2017 for training, and predict the click count to each publisher for those users on Aug. 6, 2017. We use Root-mean-square error (RMSE) as the evaluation metric, where a RMSE of zero indicates a perfect production, and the larger the worse.

The above table shows the results of the click count prediction task for different methods. We can clearly see that the estimation by example embodiments (e.g., the Gamma-poison model) achieves the best result (RMSE of 0.429) compared with the historical tap ratio (RNSE of 0.705 and 0.487 where using three days' data in one week's data respectively). We can also see that with a longer time period used for estimating HTR, the predictions of HTR achieves better performance. However, the estimation by the proposed Gamma-Poisson model still achieves the best result.

As explained above, example embodiments may be implemented and used within a messaging system. FIGS. 5-8 describe an example messaging system that may be used in example embodiments.

Figure 5:
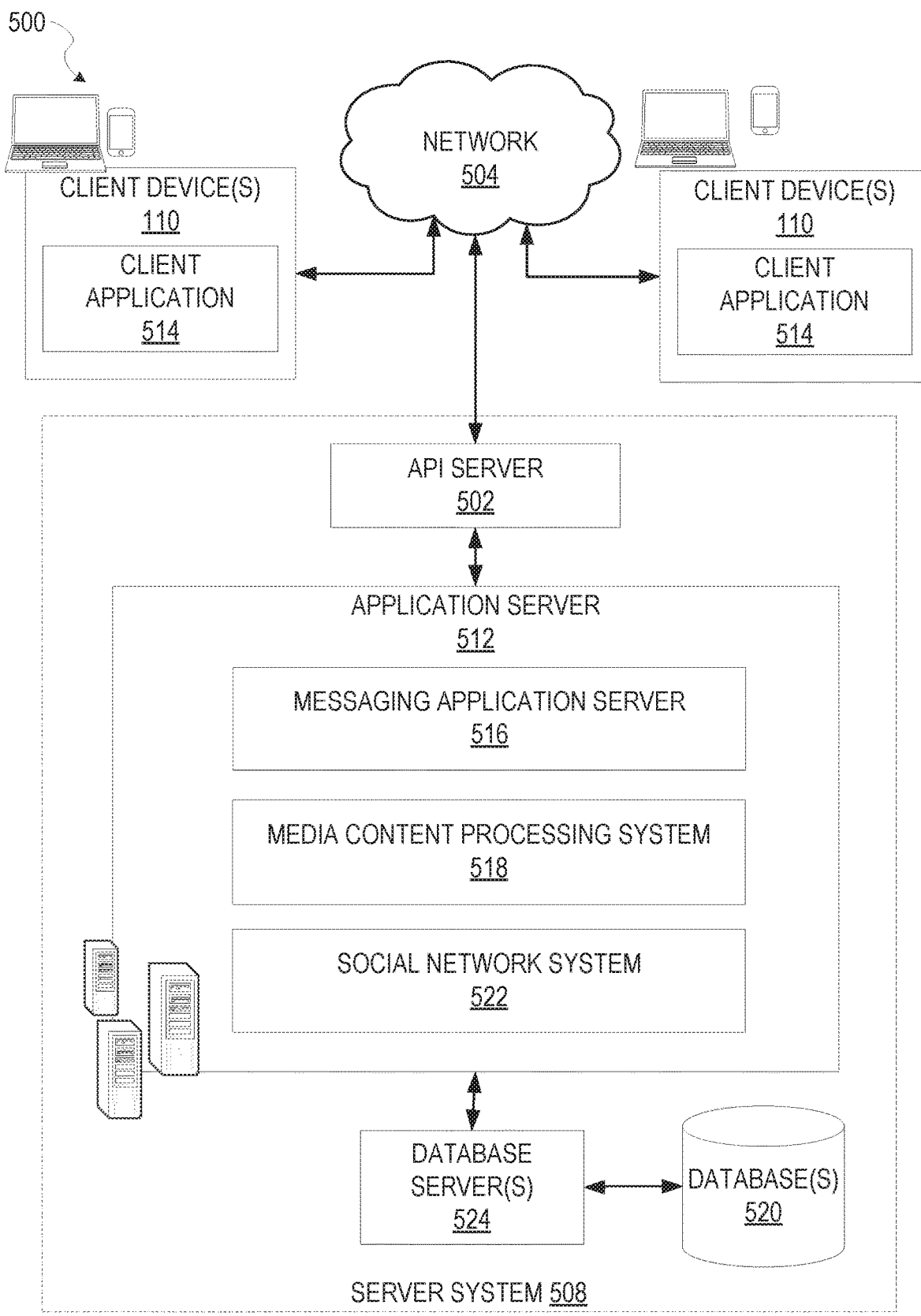
FIG. 5 is a block diagram showing an example messaging system for exchanging data (e.g., messages and associated content) over a network, according to some example embodiments.

FIG. 5 is a block diagram illustrating a networked system 500 (e.g., a messaging system) for exchanging data (e.g., messages and associated content) over a network. The networked system 500 includes multiple client devices 110, each of which hosts a number of client applications 514. Each client application 514 is communicatively coupled to other instances of the client application 514 and a server system 508 via a network 504.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 500. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays and access a plurality of media collections.

One or more users may be a person, a machine, or other means of interacting with the client device 110. In example embodiments, the user may not be part of the system 500, but may interact with the system 500 via the client device 110 or other means. For instance, the user may provide input (e.g., touch screen input or alphanumeric input) to the client device 110, and the input may be communicated to other entities in the system 500 (e.g., third party servers, server system 508. etc.) via a network 504. In this instance, the other entities in the system 500, in response to receiving the input from the user, may communicate information to the client device 110 via the network 504 to be presented to the user. In this way, the user may interact with the various entities in the system 500 using the client device 110.

The system 500 may further include a network 504. One or more portions of the network 504 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 500 via a web client (e.g., a browser, such as the Internet Explorer® browser developed by Microsoft® Corporation of Redmond, Washington State) or one or more client applications 514. The client device 110 may include one or more client applications 514 (also referred to as "apps") such as, but not limited to, a web browser, a messaging application, an electronic mail (email) application, an e-commerce site application, a mapping or location application, a media overlay application, an interactive messaging application, and the like.

In some embodiments, one or more client applications 514 may be included in a given one of the client devices 110, and configured to locally provide the user interface and at least some of the functionalities, with the client application 514 configured to communicate with other entities in the system 500 (e.g., third party servers, server system 508. etc.), on an as-needed basis, for data and/or processing capabilities not locally available (e.g., to process user queries, to authenticate a user, to verify a method of payment, etc.). Conversely, one or more client applications 514 may not be included in the client device 110, and then the client device 110 may use its web browser to access the one or more applications hosted on other entities in the system 500 (e.g., third party servers, server system 508, etc.).

In one example, a client application 514 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection (also referred to herein as a "media collection"). A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event. etc.), or lasting another predetermined time).

An ephemeral message may be associated with a message duration parameter, the value of which determines an amount of time that the ephemeral message will be displayed to a receiving user of the ephemeral message by the client application 514. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 508 may provide server-side functionality via the network 504 (e.g., the Internet or a wide area network (WAN)) to one or more client devices 110 and/or one or more third party servers (not shown). The server system 508 may include an application programming interface (API) server 502. an application server 512, a messaging application server 516, a media content processing system 518. and a social network system 522, which may each be communicatively coupled with each other and with one or more data storage(s), such as database(s) 520. The server system 508 may further comprise the computing system 100 or be in operative communication with the computing system 100 for functionality supported by the computing system 100.

The server system 508 may be a cloud-computing environment, according to some example embodiments. The server system 508, and any servers associated with the server system 508, may be associated with a cloud-based application, in one example embodiment.

The one or more database(s) 520 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110). media overlays, media overlay smart widgets or smart elements, user data, user device information, media content (e.g., video and images), media content data (e.g., data associated with video and images), computing device context data, serialized data, session data items, and so forth. The one or more databases 520 may further store information related to third party servers, third party applications, client devices 110. client applications 514, users, and so forth.

The one or more database(s) 520 may include cloud-based storage external to the server system 508 (e.g., hosted by one or more third-party entities external to the server system 508). While the storage devices are shown as database(s) 520. it is to be understood that the system 500 may access and store data in storage devices such as databases 520, blob storages, and other types of storage methods.

The system 500 may further include one or more third party servers (not shown). The one or more third party servers may include one or more third party application(s). The one or more third party application(s), executing on the third party server(s), may interact with the server system 108 via API server 502 via a programmatic interface provided by the API server 502. For example, one or more of the third party applications may request and utilize information from the server system 508 via the API server 502 to support one or more features or functions on a website hosted by the third party or an application hosted by the third party. The third party website or application, for example, may provide functionality that is supported by relevant functionality and data in the server system 508.

Accordingly, each client application 514 is able to communicate and exchange data with other client applications 514 and with the server system 508 via the network 504. The data exchanged between client applications 514, and between a client application 514 and the server system 508, includes functions (e.g., commands to invoke functions) as well as payload data (e.g., text, audio, video, or other multimedia data).

The server system 508 provides server-side functionality via the network 504 to a particular client application 514. While certain functions of the system 500 are described herein as being performed by either a client application 514 or by the server system 508, it will be appreciated that the location of certain functionality either within the client application 514 or within the server system 508 is a design choice. For example, it may be technically preferable to initially deploy certain technology and functionality within the server system 508, but to later migrate this technology and functionality to the client application 514 where a client device 110 has a sufficient processing capacity.

The server system 508 supports various services and operations that are provided to the client application 514. Such operations include transmitting data to, receiving data from, and processing data generated by the client application 514. This data may include message content, client device information, geolocation information, media annotation and overlays, message content persistence conditions, social network information, live event information, date and time stamps. media content (e.g., video and images). media content data (e.g., data associated with video and images), and user data (e.g., user click data), as examples. Data exchanges within the networked system 500 are invoked and controlled through functions available via user interfaces (UIs) of the client application 514.

In the server system 508. the API server 502 is coupled to, and provides a programmatic interface to, the application server 512. The application server 512 is communicatively coupled to a database server 524, which facilitates access to the one or more database(s) 520 in which is stored data associated with messages processed by the application server 512.

The API server 502 receives and transmits message data (e.g., commands and message payloads) between the client device 110 and the application server 512. Specifically, the API server 502 provides a set of interfaces (e.g., routines and protocols) that can be called or queried by the client application 514 in order to invoke functionality of the application server 512. The API server 502 exposes various functions supported by the application server 512, including account registration; login functionality; the sending of messages. via the application server 512, from a particular client application 514 to another client application 514; the sending of media files (e.g., images or video) from a client application 514 to the messaging application server 516. for possible access by another client application 514; the setting of a collection of media data (e.g., a gallery, story. message collection, or media collection); the retrieval of a list of friends of a user of a client device 110; the retrieval of such collections; the retrieval of messages and content; the adding of friends to and deletion of friends from a social graph; the location of friends within a social graph; opening an application event (e.g., relating to the client application 514); and so forth.

The application server 512 hosts a number of applications and subsystems. including the messaging application server 516. the media content processing system 518. and the social network system 522. The messaging application server 516 implements a number of message processing technologies and functions, particularly related to the aggregation and other processing of content (e.g., textual and multimedia content) included in messages received from multiple instances of the client application 514. The text and media content from multiple sources may be aggregated into collections of content (e.g., called stories. galleries, or media collections). These collections are then made available, by the messaging application server 516, to the client application 514. Other processor- and memory-intensive processing of data may also be performed server-side by the messaging application server 516, in view of the hardware requirements for such processing.

The application server 512 also includes the media content processing system 518, which is dedicated to performing various media content processing operations, typically with respect to images or video received within the payload of a message at the messaging application server 516. The media content processing system 518 may access one or more data storages (e.g., database(s) 520) to retrieve stored data to use in processing media content and to store results of processed media content.

The social network system 522 supports various social networking functions and services, and makes these functions and services available to the messaging application server 516. To this end, the social network system 522 maintains and accesses an entity graph 704 (depicted in FIG. 7) within the database 520. Examples of functions and services supported by the social network system 522 include the identification of other users of the networked system 500 with whom a particular user has relationships or whom the particular user is "following," and also the identification of other entities and interests of a particular user.

The messaging application server 516 may be responsible for generation and delivery of messages between users of client devices 110. The messaging application server 516 may utilize any one of a number of message delivery networks and platforms to deliver messages to users. For example, the messaging application server 516 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular. WIFI, Long Term Evolution (LTE), or Bluetooth).

Figure 6:
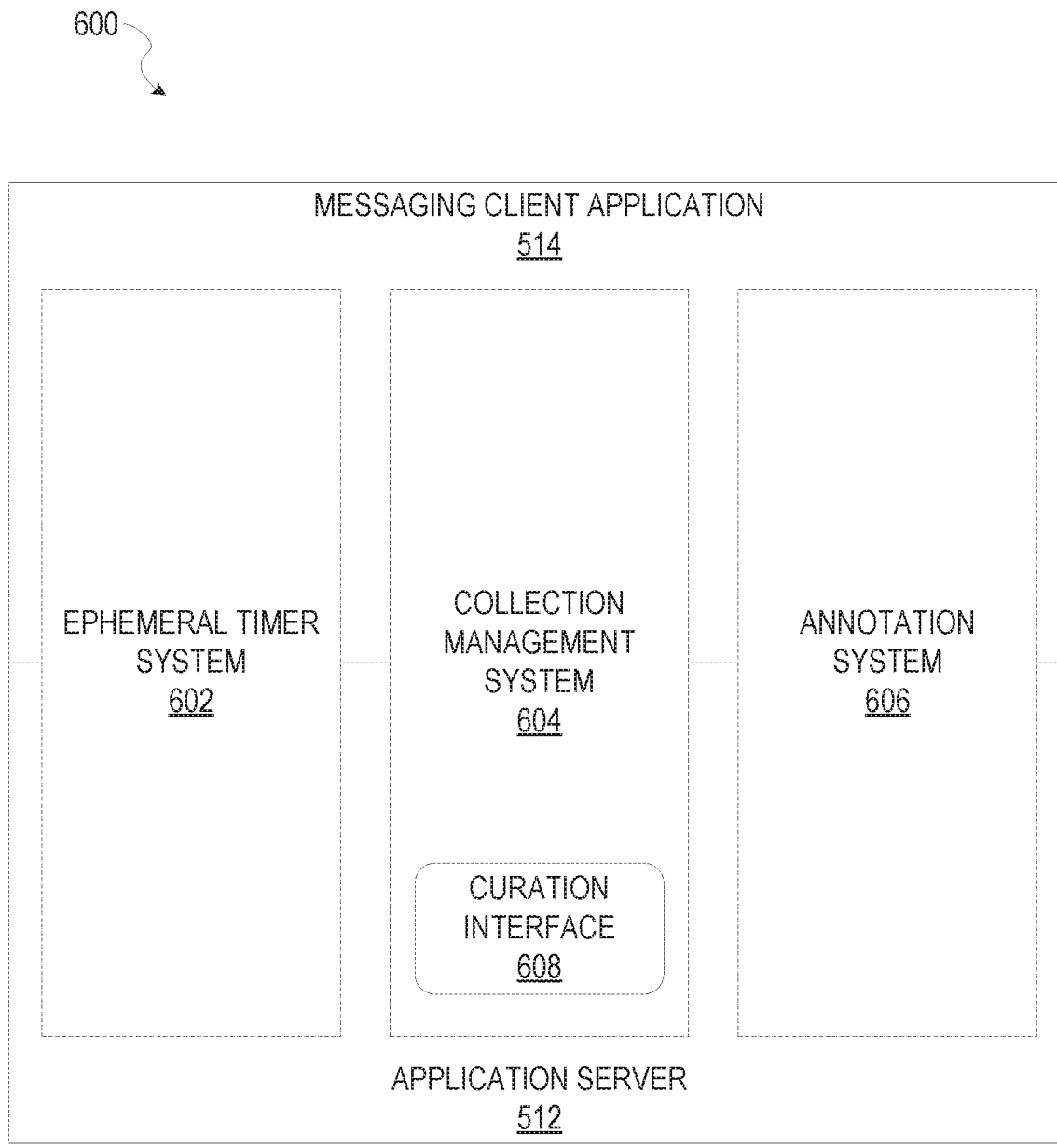
FIG. 6 is a block diagram illustrating further details regarding the messaging system, according to some example embodiments.

FIG. 6 is a block diagram 600 illustrating further details regarding the networked system 500, according to example embodiments. Specifically. the system 600 is shown to comprise the messaging client application 514 and the application server 512, which in turn embody a number of subsystems, namely an ephemeral timer system 602, a collection management system 604, and an annotation system 606.

The ephemeral timer system 602 is responsible for enforcing the temporary access to content permitted by the messaging client application 514 and the messaging application server 516. To this end, the ephemeral timer system 602 incorporates a number of timers that. based on duration and display parameters associated with a message, or collection of messages (e.g., otherwise referred to herein as media collections, galleries, message collections, stories. and the like), selectively display and enable access to messages and associated content via the messaging client application 514.

The collection management system 604 is responsible for managing collections of media (e.g., collections of text, image, video, and audio data), otherwise referred to herein as "media collections." In some examples, a collection of content (e.g., messages. including images. video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 604 may also be responsible for publishing an icon that provides notification of the existence of a particular collection to the user interface of the messaging client application 514.

The collection management system 604 furthermore includes a curation interface 608 that allows a collection manager to manage and curate a particular collection of content. For example, the curation interface 608 enables an event organizer to curate a collection of content relating to a specific event (e.g., delete inappropriate content or redundant messages). Additionally, the collection management system 604 employs machine vision (or image recognition technology) and content rules to automatically curate a content collection. In certain embodiments, compensation (e.g., money, non-money credits or points associated with the messaging system or a third party reward system, travel miles, access to artwork or specialized lenses. etc.) may be paid to a user for inclusion of user-generated content into a collection. In such cases, the curation interface 608 operates to automatically make payments to such users for the use of their content.

The annotation system 606 provides various functions that enable a user to annotate or otherwise modify or edit media content associated with a message. For example, the annotation system 606 provides functions related to the generation and publishing of media overlays for messages processed by the networked system 500. In one example, the annotation system 606 operatively supplies a media overlay (e.g., a filter or media augmentation) to the messaging client application 514 based on a geolocation of the client device 110. In another example, the annotation system 606 operatively supplies a media overlay to the messaging client application 514 based on other information. such as social network information of the user of the client device 110. A media overlay may include audio and visual content and visual effects. Examples of audio and visual content include pictures. texts. logos, animations. and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, or a name of a merchant overlay (e.g., Beach Coffee House). In another example, the annotation system 606 uses the geolocation of the client device 110 to identify a media overlay that includes the name of a merchant at the geolocation of the client device 110. The media overlay may include other indicia associated with the merchant. The media overlays may be stored in the database 520 and accessed through the database server 524.

The annotation system 606 may further enable a user to interact with an interactive message, such as by adding one or more media content items to the interactive message, as described in further detail below. In one example embodiment, the annotation system 606 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 606 provides a user-based publication platform that enables users to select a geolocation on a map, and upload content associated with the selected geolocation. The user may also specify circumstances under which a particular media overlay is to be offered to other users. The annotation system 606 generates a media overlay that includes the uploaded content and associates the uploaded content with the selected geolocation.

In another example embodiment, the annotation system 606 provides a merchant-based publication platform that enables merchants to select a particular media overlay associated with a geolocation via a bidding process. For example, the annotation system 606 associates the media overlay of a highest bidding merchant with a corresponding geolocation for a predefined amount of time.

Figure 7:
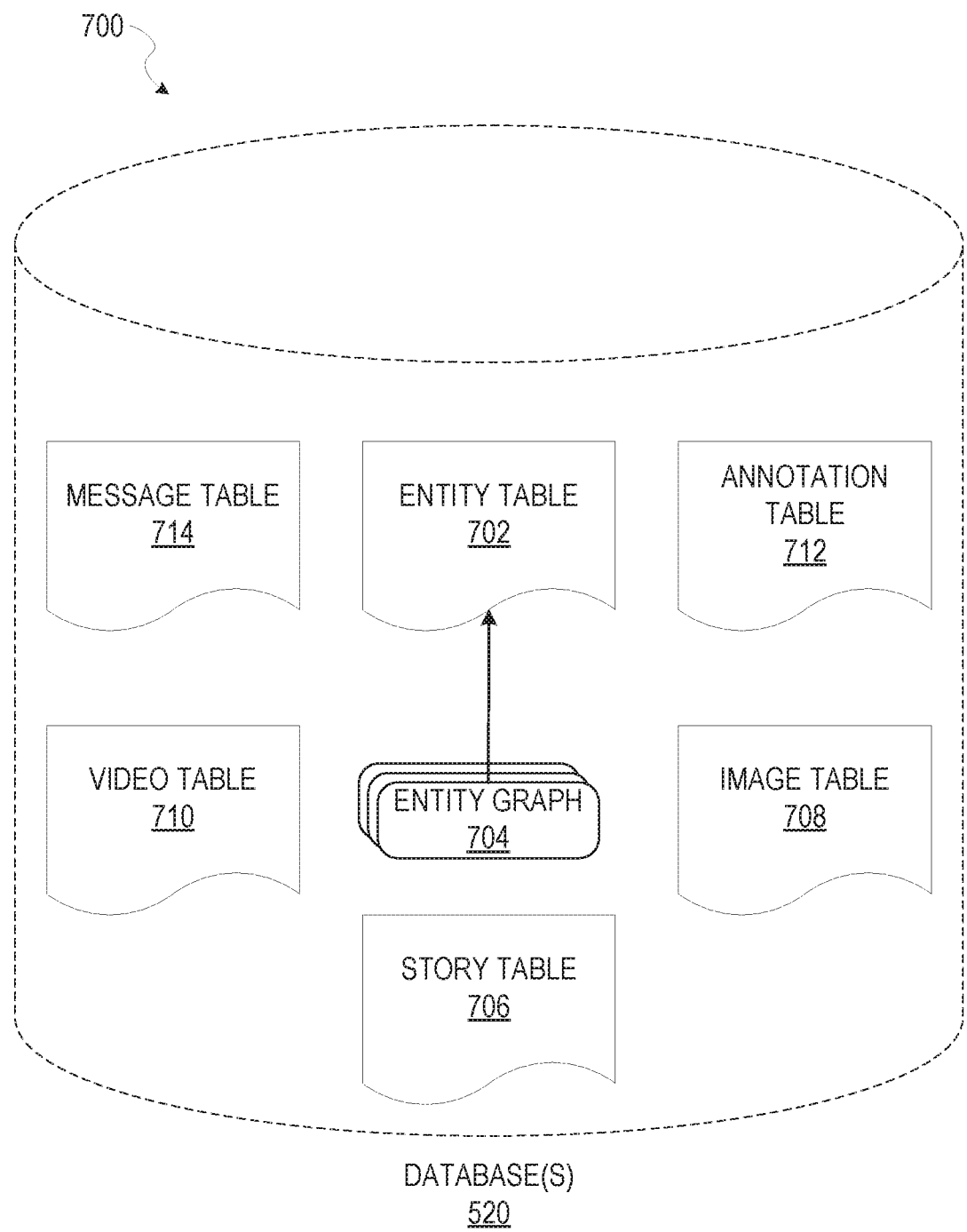
FIG. 7 is a schematic diagram illustrating data which may be stored in a database of a messaging server system, according to some example embodiments.

FIG. 7 is a schematic diagram 700 illustrating data which may be stored in the database(s) 520 of the server system 508, according to certain example embodiments. While the content of the database 520 is shown to comprise a number of tables, it will be appreciated that the data could be stored in other types of data structures (e.g., as an object-oriented database).

The database 520 includes message data stored within a message table 714. An entity table 702 stores entity data, including an entity graph 704. Entities for which records are maintained within the entity table 702 may include individuals, corporate entities, organizations, objects, places. events, etc. Regardless of type, any entity regarding which the server system 508 stores data may be a recognized entity. Each entity is provided with a unique identifier, as well as an entity type identifier (not shown).

The entity graph 704 furthermore stores information regarding relationships and associations between entities. Such relationships may be social, professional (e.g., work at a common corporation or organization), interested-based. or activity-based, merely for example.

The database 520 also stores annotation data, in the example form of media overlays or filters, in an annotation table 712. Annotation data may also be referred to herein as "creative tools" or "interactive features." Annotation data may comprise predefined interactive messages to be provided to users.

Media overlays or filters, for which data is stored within the annotation table 712, are associated with and applied to videos (for which data is stored in a video table 710) and/or images (for which data is stored in an image table 708). Filters, in one example, are overlays that are displayed as overlaid on an image or video during presentation to a recipient user. Filters may be of various types, including user-selected filters from a gallery of filters presented to a sending user by the messaging client application 514 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 514. based on geolocation information determined by a GPS unit of the client device 110. Another type of filter is a data filter, which may be selectively presented to a sending user by the messaging client application 514, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 712 is so-called "lens" data. A "lens" may be a real-time special effect and sound that may be added to an image or a video.

As mentioned above, the video table 710 stores video data which, in one embodiment. is associated with messages for which records are maintained within the message table 714. Similarly. the image table 708 stores image data associated with messages for which message data is stored in the message table 714. The entity table 702 may associate various annotations from the annotation table 712 with various images and videos stored in the image table 708 and the video table 710.

A story table 706 stores data regarding collections of messages and associated image, video, or audio data, which are compiled into a collection (e.g., a story. gallery, or media collection). The creation of a particular collection may be initiated by a particular user (e.g., any user for whom a record is maintained in the entity table 702). A user may create a "personal story" in the form of a collection of content that has been created and sent/broadcast by that user. To this end, the user interface of the messaging client application 514 may include an icon that is user-selectable to enable a sending user to add specific content to his or her personal story.

A media or message collection may also constitute a "live story." which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 514, to contribute content to a particular live story. The live story may be identified to the user by the messaging client application 514. based on his or her location. The end result is a "live story" told from a community perspective.

A further type of content collection is known as a "location story." which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 8:
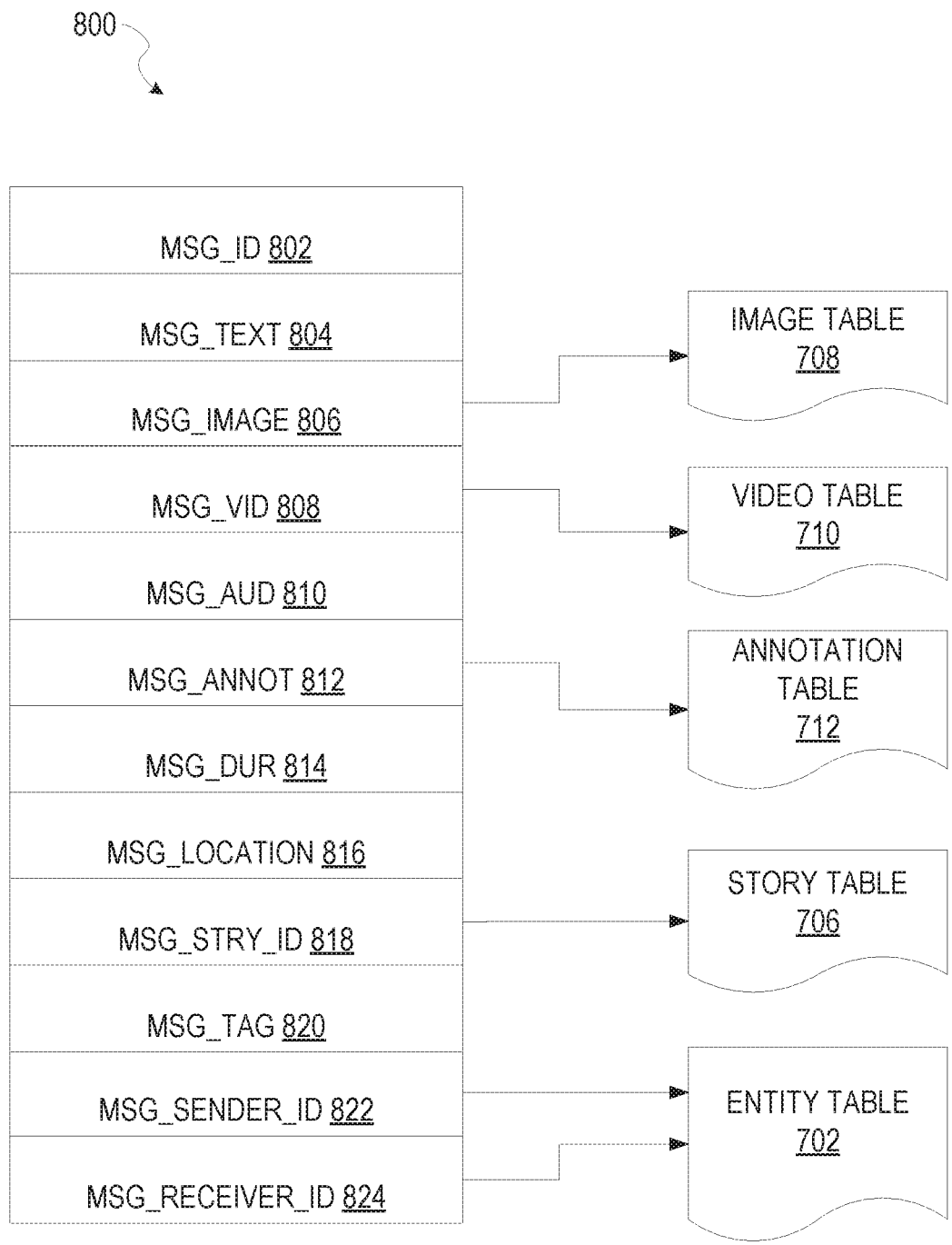
FIG. 8 is a schematic diagram illustrating a structure of a message, according to some embodiments, generated by a messaging client application for communication.

FIG. 8 is a schematic diagram illustrating a structure of a message 800, according to some embodiments, generated by a client application 514 for communication to a further client application 514 or the messaging application server 516. The content of a particular message 800 is used to populate the message table 714 stored within the database 520. accessible by the messaging application server 516. Similarly, the content of a message 800 is stored in memory as "in-transit" or "in-flight" data of the client device 110 or the application server 512. The message 800 is shown to include the following components:

- A message identifier 802: a unique identifier that identifies the message 800.
- A message text payload 804: text, to be generated by a user via a user interface of the client device 110 and that is included in the message 800.
- A message image payload 806: image data, captured by a camera component of a client device 110 or retrieved from memory of a client device 110, and that is included in the message 800.
- A message video payload 808: video data, captured by a camera component or retrieved from a memory component of the client device 110 and that is included in the message 800.
- A message audio payload 810: audio data, captured by a microphone or retrieved from the memory component of the client device 110, and that is included in the message 800.
- A message annotations 812: annotation data (e.g., media overlays such as filters. stickers, or other enhancements) that represents annotations to be applied to the message image payload 806, message video payload 808. or message audio payload 810 of the message 800.
- A message duration parameter 814: a parameter value indicating, in seconds, the amount of time for which content of the message 800 (e.g., the message image payload 806, message video payload 808. message audio payload 810) is to be presented or made accessible to a user via the messaging client application 514.
- A message geolocation parameter 816: geolocation data (e.g., latitudinal and longitudinal coordinates) associated with the content payload of the message 800. Multiple message geolocation parameter 816 values may be included in the payload, each of these parameter values being associated with respect to content items included in the content (e.g., a specific image within the message image payload 806, or a specific video in the message video payload 808).
- A message story identifier 818: identifier values identifying one or more content collections (e.g., "stories") with which a particular content item in the message image payload 806 of the message 800 is associated. For example, multiple images within the message image payload 806 may each be associated with multiple content collections using identifier values.
- A message tag 820: each message 800 may be tagged with multiple tags, each of which is indicative of the subject matter of content included in the message payload. For example, where a particular image included in the message image payload 806 depicts an animal (e.g., a lion), a tag value may be included within the message tag 820 that is indicative of the relevant animal. Tag values may be generated manually. based on user input, or may be automatically generated using, for example, image recognition.
- A message sender identifier 822: an identifier (e.g., a messaging system identifier, email address, or device identifier) indicative of a user of the client device 110 on which the message 800 was generated and from which the message 800 was sent.
- A message receiver identifier 824: an identifier (e.g., a messaging system identifier, email address, or device identifier) indicative of a user of the client device 110 to which the message 800 is addressed.

The contents (e.g., values) of the various components of the message 800 may be pointers to locations in tables within which content data values are stored. For example, an image value in the message image payload 806 may be a pointer to (or address of) a location within an image table 708. Similarly, values within the message video payload 808 may point to data stored within a video table 710. values stored within the message annotations 812 may point to data stored in an annotation table 712, values stored within the message story identifier 818 may point to data stored in a story table 706. and values stored within the message sender identifier 822 and the message receiver identifier 824 may point to user records stored within an entity table 702.

Figure 9:
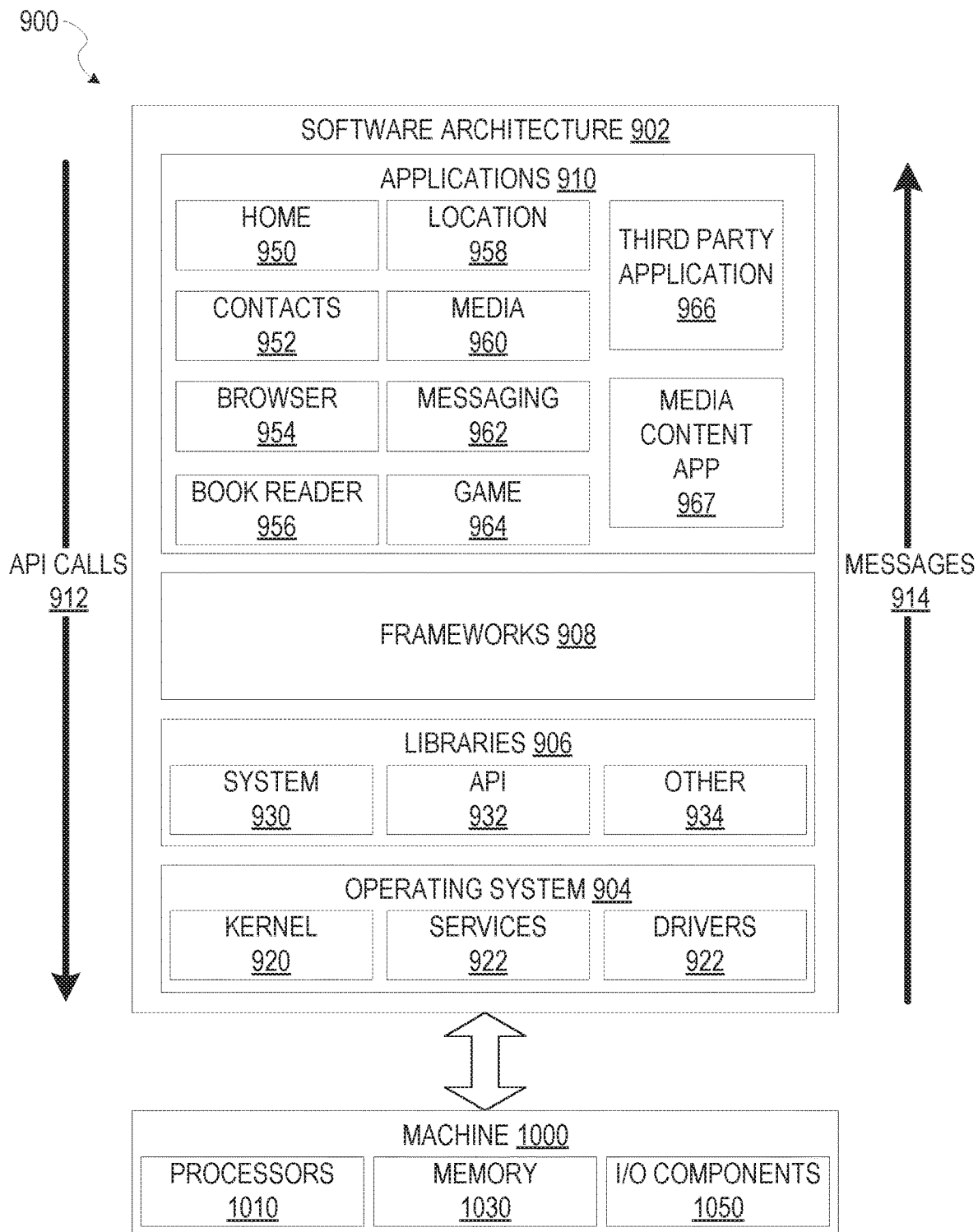
FIG. 9 is a block diagram illustrating an example of a software architecture that may be installed on a machine, according to some example embodiments.

FIG. 9 is a block diagram 900 illustrating a software architecture 902, which can be installed on any one or more of the devices described above. For example, in various embodiments, client devices 110. server systems 100 and 508. and servers 502, 512, 516, 518, 522, and 524 may be implemented using some or all of the elements of the software architecture 902. FIG. 9 is merely a non-limiting example of a software architecture, and it will be appreciated that many other architectures can be implemented to facilitate the functionality described herein. In various embodiments, the software architecture 902 is implemented by hardware such as machine 1000 of FIG. 10 that includes processors 1010. memory 1030. and I/O components 1050. In this example, the software architecture 902 can be conceptualized as a stack of layers where each layer may provide a particular functionality. For example, the software architecture 902 includes layers such as an operating system 904, libraries 906, frameworks 908, and applications 910. Operationally. the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922. and drivers 924. The kernel 920 acts as an abstraction layer between the hardware and the other software layers, consistent with some embodiments. For example, the kernel 920 provides memory management. processor management (e.g., scheduling), component management. networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)). graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 966 can invoke the API calls 912 provided by the operating system 904 to facilitate functionality described herein.

Some embodiments may particularly include a media content application 967. In certain embodiments, this may be a standalone application that operates to manage communications with a server system such as third party servers or server system 100 or 508. In other embodiments, this functionality may be integrated with another application (e.g., messaging application 1262). The media content application 967 may request and display various data related to messaging, media content, media collections, media overlays, and so forth, and may provide the capability for a user to input data related to the system via a touch interface, keyboard, or using a camera device of machine 1000, communication with a server system via I/O components 1050, and receipt and storage of object data in memory 1030. Presentation of information and user inputs associated with the information may be managed by the media content application 967 using different frameworks 908, library 906 elements, or operating system 904 elements operating on a machine 1000.

Figure 10:
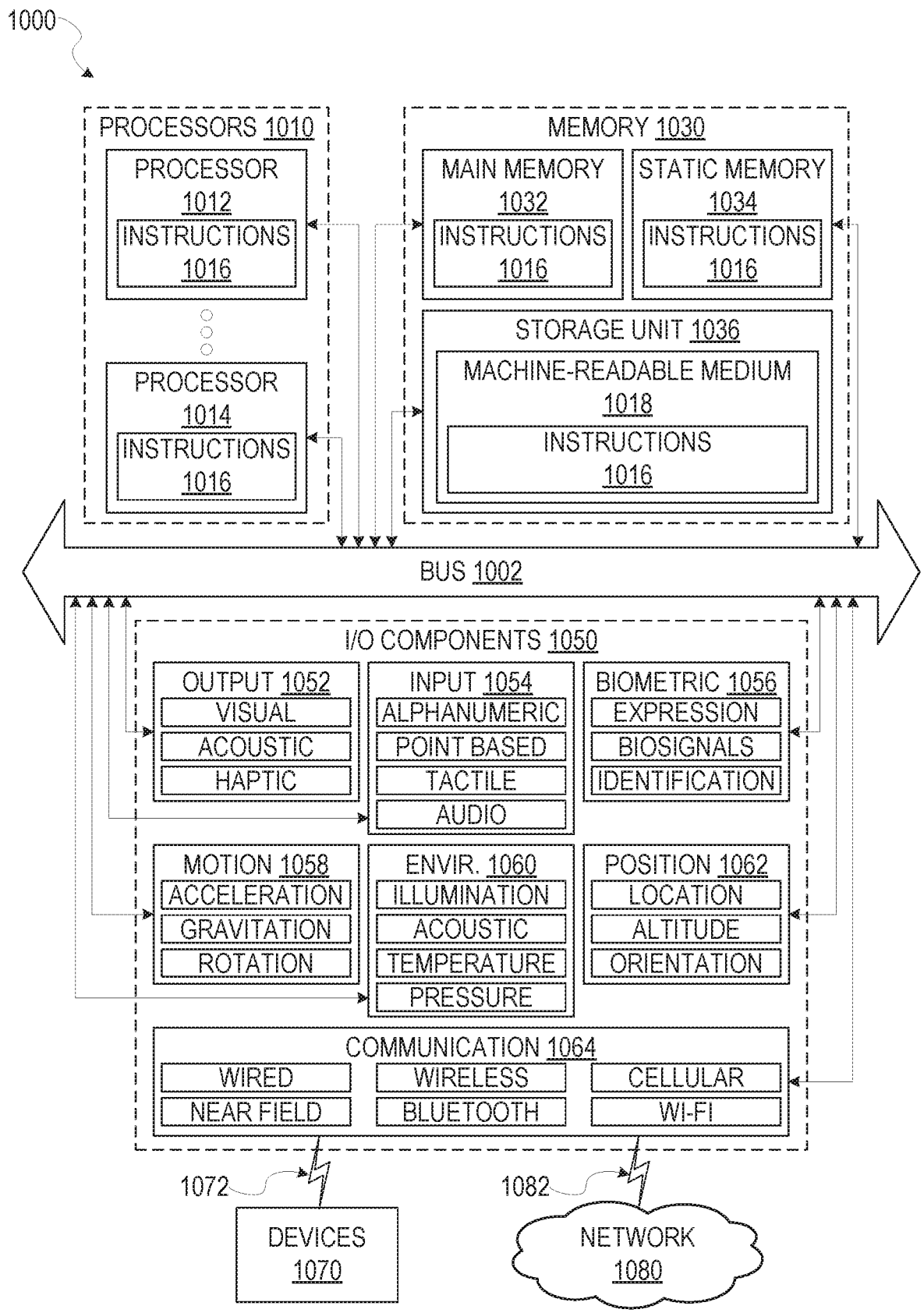
FIG. 10 illustrates a diagrammatic representation of a machine, in the form of a computer system, within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine 100, 508, 512, 516, 522, 524, and the like, or a client device 110 in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1012, 1014 with a single core, multiple processors 1012, 1014 with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1018 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1018.

As used herein, the term "memory" refers to a machine-readable medium 1018 able to store data temporarily or permanently and may be taken to include, but not be limited to, random-access memory (RAM), read-only memory (ROM), buffer memory. flash memory, and cache memory. While the machine-readable medium 1018 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016. when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input. provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)). acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard. or other alphanumeric input components). point-based input components (e.g., a mouse, a touchpad, a trackball, a joystick, a motion sensor, or other pointing instruments), tactile input components (e.g., a physical button. a touch screen that provides location and force of touches or touch gestures. or other tactile input components), audio input components (e.g., a microphone), and the like.

In some further example embodiments, the I/O components 1050 include biometric components 1056, motion components 1058, environmental components 1060. or position components 1062, among a wide array of other components. For example, the biometric components 1056 include components to detect expressions (e.g., hand expressions, facial expressions. vocal expressions, body gestures, or eye tracking). measure biosignals (e.g., blood pressure, heart rate. body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects). gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component). altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components. wireless communication components, cellular communication components, near field communication (NFC) components. BLUETOOTH® components (e.g., BLUETOOTH® Low Energy). WI-FI® components, and other communication components to provide communication via other modalities. The devices 1070 may be another machine 1000 or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include radio frequency identification (RFID) tag reader components. NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code. Data Matrix. Dataglyph, MaxiCode, PDF417. Ultra Code. Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet. an extranet, a virtual private network (VPN), a local area network (LAN), a wireless LAN (WLAN). a wide area network (WAN), a wireless WAN (WWAN), a metropolitan area network (MAN). the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1018 is non-transitory (in other words, not having any transitory signals) in that it does not embody a propagating signal. However, labeling the machine-readable medium 1018 "non-transitory" should not be construed to mean that the medium is incapable of movement; the medium 1018 should be considered as being transportable from one physical location to another. Additionally, since the machine-readable medium 1038 is tangible, the machine-readable medium 1018 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   generating, by a computing system, for each of a plurality of users, a user click prediction table comprising a count corresponding to a number of times a user clicks on a type of media collection;
   analyzing the user click prediction table for each of the plurality of users using a machine learning model comprising a Poisson gamma model and trained to estimate an affinity a given user has for a type of media collection based on a feature vector comprising user features and features for each type of media collection and using a correction factor based on a user click history;
   storing, by the computing system, prediction values generated by the machine learning model as user profile data for each user of the plurality of users, each prediction value indicating how much preference a given user has for a corresponding type of media collection; and
   sending one or more prediction values associated with a user identifier to a client device to cause display of a plurality of media collections ranked in an order based on the one or more prediction values.

2. The method of claim 1, wherein before sending the one or more prediction values associated with the user identifier to the client device, the method comprises:
   receiving, from the client device, a request for the one or more prediction values for each type of media collection for a user associated with the user identifier; and
   wherein the client device displays the plurality of media collections ranked in the order based on the one or more prediction values such that a media collection of the plurality of media collections that is associated with a highest prediction value is displayed first in the plurality of media collections.

3. The method of claim 1, further comprising:
training a function for an affinity score, using user data comprising features related to each of the plurality of users; and
wherein the trained function for the affinity score is used to train the machine learning model.

4. The method of claim 3, wherein the function for the affinity score is trained using logistic regression.

5. The method of claim 3, wherein training of the function for the affinity score comprises:
(a) fixing the correction factor to 1 to find a first best weight for each feature vector for a user-type pair, of a plurality of feature vectors for a plurality of user-type pairs;
(b) fixing a weight to the first best weight to re-estimate the correction factor;
(c) fixing the correction factor to the re-estimated correction factor to find a best weight for each feature vector for a user-type pair, of a plurality of feature vectors for a plurality of user-type pairs;
(d) fixing the weight to the best weight to re-estimate the correction factor; and
(e) reiterating steps (c) and (d) until a predetermined number of reiterations is reached or converged.

6. A system comprising:
one or more hardware processors; and
a computer-readable medium coupled with the one or more hardware processors, the computer-readable medium comprising instructions stored thereon that are executable by the one or more hardware processors to cause the system to perform operations comprising:
generating, for each of a plurality of users, a user click prediction table comprising a count corresponding to a number of times a user clicks on a type of media collection;
analyzing the user click prediction table for each of the plurality of users using a machine learning model comprising a Poisson gamma model and trained to estimate an affinity a given user has for a type of media collection based on a feature vector comprising user features and features for each type of media collection and using a correction factor based on a user click history;
storing prediction values generated by the machine learning model as user profile data for each user of the plurality of users, each prediction value indicating how much preference a given user has for a corresponding type of media collection; and
sending one or more prediction values associated with a user identifier to a client device to cause display of a plurality of media collections ranked in an order based on the one or more predictions values.

7. The system of claim 6, wherein before sending the one or more prediction values associated with the user identifier to the client device, the operations comprise:
receiving, from h client device, a request for the one or more prediction values for each type of media collection for a user associated with the user identifier; and
wherein the client device displays the plurality of media collections ranked in the order based on the one or more prediction values such that a media collection of the plurality of media collections that is associated with a highest prediction value is displayed first in the plurality of media collections.

8. The system of claim 6, the operations further comprising:
training a function for an affinity score, using user data comprising features related to each of the plurality of users; and
wherein the trained function for the affinity score is used to train the machine learning model.

9. The system of claim 8, wherein the function for the affinity score is trained using logistic regression.

10. The system of claim 9, wherein training of the function for the affinity score comprises:
(a) fixing the correction factor to 1 to find a first best weight for each feature vector for a user-type pair, of a plurality of feature vectors for a plurality of user-type pairs;
(b) fixing a weight to the first best weight to re-estimate the correction factor;
(c) fixing the correction factor to the re-estimated correction factor to find a best weight for each feature vector for a user-type pair, of a plurality of feature vectors for a plurality of user-type pairs;
(d) fixing the weight to the best weight to re-estimate the correction factor; and
(e) reiterating steps (c) and (d) until a predetermined number of reiterations is reached or converged.

11. A non-transitory computer-readable medium comprising instructions stored thereon that are executable by at least one processor to cause a computing device to perform operations comprising:
generating, for each of a plurality of users, a user click prediction table comprising a count corresponding to a number of times a user clicks on a type of media collection;
analyzing the user click prediction table for each of the plurality of users using a machine learning model comprising a Poisson gamma model and trained to estimate an affinity a given user has for a type of media collection based on a feature vector comprising user features and features for each type of media collection and using a correction factor based on a user click history;
storing prediction values generated by the machine learning model as user profile data for each user of the plurality of users, each prediction value indicating how much preference a given user has for a corresponding type of media collection; and
sending one or more prediction values associated with a user identifier to a client device to cause display of a plurality of media collections ranked in an order based on the one or more predictions values.

12. The method of claim 1, wherein the count spans multiple time granularities.

13. The method of claim 1, wherein the user click history table comprises user data for each day in a predetermined time period.

14. The method of claim 1, wherein the user profile data comprises, for each user of the plurality of users, a user identifier and a prediction value generated by the machine learning model for each type of media collection.

15. The method of claim 1, wherein the user click prediction table is generated from data one day prior to a day that the prediction values are generated by the machine learning model.

16. The method of claim 1, wherein user features comprise at least one of demographics, interests, or geographic location.

17. The method of claim 1, wherein the features for each type of media collection comprise at least one of a subject associated with a media collection or an age range of target or typical users for the media collection.

18. The method of claim 1, wherein the correction factor for an infrequent user is close to one causing prediction values for infrequent users to be more dependent on the feature vector.

19. The method of claim 1, wherein frequent users are largely affected by the correction factor causing prediction values for frequent users to be determined more by user click history.

20. The non-transitory computer-readable medium of claim 11, wherein before sending the one or more prediction values associated with the user identifier to the client device, the operations comprise:
   receiving, from the client device, a request for the one or more prediction values for each type of media collection for a user associated with the user identifier; and
   wherein the client device displays the plurality of media collections ranked in the order based on the one or more prediction values such that a media collection of the plurality of media collections that is associated with a highest prediction value is displayed first in the plurality of media collections.

* * * * *

UNITED STATES PATENT AND TRADEMARK OFFICE
CERTIFICATE OF CORRECTION

| | |
|---|---|
| PATENT NO. | : 11,907,312 B1 |
| APPLICATION NO. | : 15/862403 |
| DATED | : February 20, 2024 |
| INVENTOR(S) | : Li et al. |

Page 1 of 1

It is certified that error appears in the above-identified patent and that said Letters Patent is hereby corrected as shown below:

On the Title Page

In Column 2, item (56) under "Other Publications", Line 2, delete "MiningAug." and insert --Mining Aug.-- therefor In the Claims In Column 23, Line 59, in Claim 7, delete "h" and insert --the-- therefor Signed and Sealed this
Eighth Day of April, 2025

Coke Morgan Stewart
*Acting Director of the United States Patent and Trademark Office*